United States Patent [19]

Maher et al.

[11] 4,174,073

[45] Nov. 13, 1979

[54] MULTI CONTAINER INTERLOCKED FOOD MACHINE WITH A SAFETY SWITCH FOR EACH CONTAINER

[75] Inventors: William M. Maher, Churchville; Duane M. Seaburg, Oakfield, both of N.Y.

[73] Assignee: General Electric Company, New York, N.Y.

[21] Appl. No.: 924,938

[22] Filed: Jul. 17, 1978

[51] Int. Cl.² ............................................. B02C 18/12
[52] U.S. Cl. ..................................... 241/36; 241/37.5
[58] Field of Search ............... 241/36, 37.5, 282.1, 241/282.2

[56] References Cited

U.S. PATENT DOCUMENTS

| | | | |
|---|---|---|---|
| 2,698,164 | 12/1954 | Lamb | 259/108 |
| 3,809,325 | 5/1974 | Marrie | 241/278 R |
| 3,892,365 | 7/1975 | Verdun | 241/282.1 X |
| 4,071,789 | 1/1978 | Ernster et al. | 310/50 |

*Primary Examiner*—Richard B. Lazarus
*Attorney, Agent, or Firm*—John F. Cullen; George R. Powers; Leonard J. Platt

[57] ABSTRACT

In a multi container interlocked food machine having a power base with a bowl-supporting portion and driven shaft extending vertically therefrom, with an upstanding motor-containing housing, a processor bowl having structure locking it on the supporting portion and containing a cutter on the shaft, a lid on the bowl operatively connected to an interlock of an internal lid switch-controlled motor energizing circuit to deenergize said circuit on lid removal, an improved second interlock mechanism is provided comprising a separate smaller diameter blender jar and cutter disposable on the shaft, base securing structure on the jar locks it on the base portion concentric with the bowl locking portion, an internal separate jar switch is connected to the motor circuit in parallel with the lid switch, the base securing structure operatively connecting with the jar switch through a biased slider mechanism, whereby on mounting the jar on the base, the jar switch is closed to "on" position to automatically by-pass the lid switch thus inactivating the processor bowl interlock for operation of the machine with the jar as a blender. The details of the internal second interlock structure is disclosed herein.

8 Claims, 7 Drawing Figures

SWITCH OPEN-"OFF"

SWITCH CLOSED — "ON"

SWITCH OPEN — "OFF"

MULTI CONTAINER INTERLOCKED FOOD MACHINE WITH A SAFETY SWITCH FOR EACH CONTAINER

BACKGROUND OF THE INVENTION

1. Field of the Invention

The invention relates to a multi container interlocked food machine having a power base with a bowl supporting portion alongside with a vertically driven shaft operable in a bowl thereon. An interlocking structure between the bowl lid and power supply circuit is standard such that, on assembly, the bowl lid must be in position for the processor to be operated and removal of the lid opens an internal lid switch to deenergize the circuit. To this known structure an improved second interlock is provided in conjunction with a blender jar secured on the same base portion concentric with the bowl and having an internal jar switch in parallel with the lid switch in the motor circuit. Detailed second interlock structure is disclosed whereby on mounting the jar on the base, the jar switch is closed to "on" to automatically by-pass the lid switch inactivating the processor bowl interlock so that the machine may be operated with the jar as a blender.

2. Description of the Prior Art

Food processors, devices fitting in the speed range between blenders and mixers, are now well known as a multi-purpose kitchen apparatus using multiple interchangeable rotary tools such as blades, knives, cutting and rasping discs, and other tools for performing different operations on food as blending, mixing, grating, grinding, chopping, whipping, and other operations in a short time. The food processor machine generally comprises a power base with a bowl supporting portion and a vertically driven shaft that carries the cutters or other tools in the bowl. A lid that is interlocked with the motor circuit, which usually contains a safety chute for introducing food to the bowl, inactivates the processor when the lid is removed and the sharp knives are exposed. Some devices are flexible by providing means whereby the same basic power unit forms a food processing appliance that may operate in many speed ranges from blenders to mixers depending on what bowl is selected automatically providing the correct shaft speed for the operation desired. Such a device is shown in copending Continuation application Ser. No. 876,764 filed Feb. 10, 1978 of common assignment now U.S. Pat. No. 4,153,210. Additionally, a specific form of lid switch actuated interlocking structure is shown in copending application Ser. No. 790,271 filed Apr. 25, 1977 also of common assignment now U.S. Pat. No. 4,111,372.

An object of the present invention is to provide a multi container interlocked food machine of the general type known as the food processor having a lid interlock system as in said Ser. No. 790,271 application supra wherein a combination is provided so the same structure is usable as a blender with a second concentric interlock system by the placement of a blender jar on the same drive shaft, the blender jar automatically interconnecting to by-pass the food processor lid interlock for operation of the same machine as a full time blender merely by putting the jar in position.

Another object is to provide such a multi container interlocked food machine combination wherein the interlocking structures are so connected that one automatically acts upon the other for operation either as a processor or a blender merely by placing the correct bowl or jar in position.

A further object is to provide such an appliance wherein the power unit and bowl or jar support in such a combination are side-by-side to reduce the overall height of the appliance.

SUMMARY OF THE INVENTION

Briefly described, the invention is directed to a multi container interlocked food machine having a power base with a bowl supporting portion and driven shaft extending vertically into a bowl, and an upstanding motor-containing housing alongside, a processor bowl having means locking it on said support portion and containing a cutter on the shaft and a lid on the bowl operatively connected to an interlock of an internal lid switch-controlled motor energizing circuit to deenergize the circuit on lid removal. This arrangement is shown in co-pending application Ser. No. 790,271 supra of common assignment. To this general combination, the invention herein adds a second interlock system comprising a separate smaller diameter blender jar and cutter disposable on the shaft and having base securing means such as lugs on the jar locking it on the base portion concentric with and generally within the bowl means locking portion. An internal jar switch is connected to the motor circuit in parallel with the processor lid switch and the base securing means operatively connects with the jar switch such that, on mounting the jar on the base, the jar switch is closed to "on" to automatically by-pass the lid switch thus inactivating the processor bowl interlock for operation of the machine with the jar in place as a blender. Thus, the main object of the invention is to provide a multi container interlocked food machine that may be operated as a food processor with a bowl in place or as a blender with a jar in place and with each container actuating interconnecting structure so that the necessary interlocking safety mechanism is triggered depending on which container is in position all being automatic by merely placing the correct container on the base supporting portion.

DESCRIPTION OF THE PREFERRED EMBODIMENT

Figure 1:
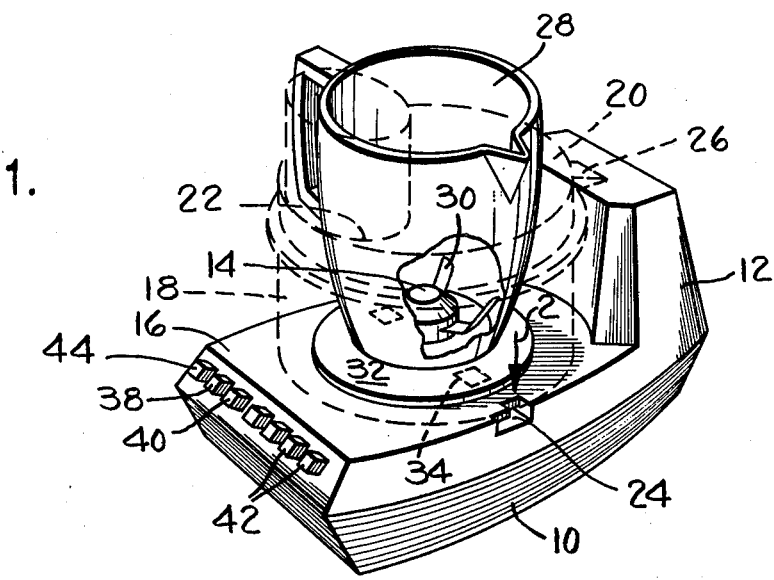
FIG. 1 is a perspective view, partially in section and phantom, of the food machine.

Referring to FIG. 1, there is shown a multi container food machine of the typical food processor appliance including a basic blender-type power base 10 which is preferably L-shaped having an upstanding motor such as a low cost series motor which drives a power shaft 14 by a suitable linkage between the power unit and shaft 14. Disposed on the bowl supporting portion 16 of the base is a removable processor bowl 18 with a cutting mechanism on shaft 14 all as well known in the art. As shown in phantom, bowl 18 is a relatively large processor bowl having a lid 20 with an integral chute 22 by which food is introduced to the bowl. The bowl is locked on the bowl supporting portion 16 of the base by suitable lugs fitting in locking means 24 by rotating the bowl into position on supporting portion 16. Thus, the processor bowl and cutting mechanism are supported on portion 16 with the cutters being driven from motor unit 12 in the base 10 and generally at a given speed. For safety purposes, the lid 22, when on the bowl, is operatively connected to an interlock of an internal lid switch through an arm 26 with the switch operating and controlling a motor energizing circuit so that the motor circuit is deenergized as a safety feature when the lid is opened. Such a general combination is shown in said co-pending allowed Ser. No. 790,271 application supra with the detailed lid interlock structure and it is to this structure, incorporated herein by reference, that the present invention adds a second cooperating interlock so the same basic unit may be used as a blender as will become apparent.

Figure 2:
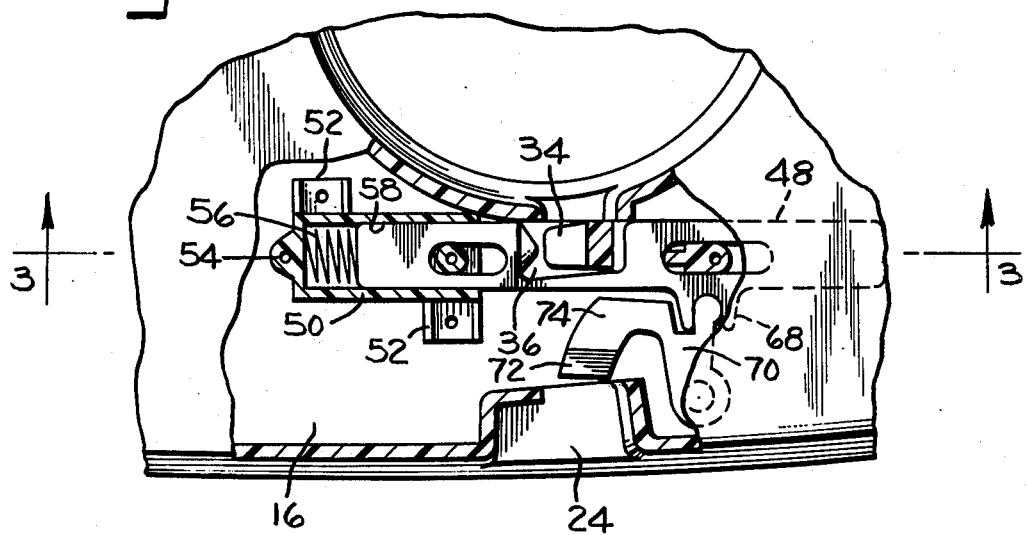
FIG. 2 is a view, partially in section at arrow 2 in FIG. 1, showing the jar switch in "open" position.
Figure 3:
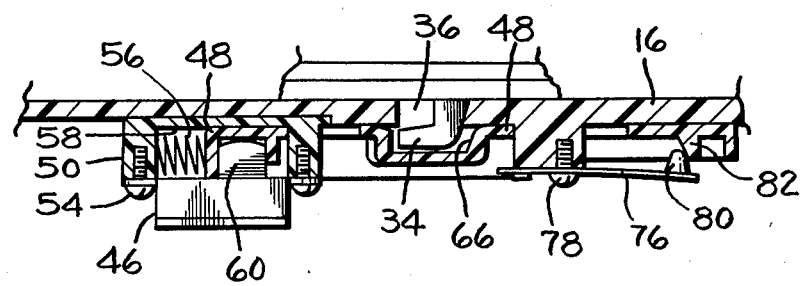
FIG. 3 is a partial sectional view taken on line 3—3 of FIG. 2.

In order to provide a low profile machine, while not mandatory, it is preferable that the L-shape be used as shown in order to reduce the overall height of the appliance. To permit the use of the basic power unit for driving a blender, there is provided a separate smaller diameter blender jar 28 of conventional shape and having cutters 30 which fit over or are disposed on shaft 14 to be driven in the normal fashion. Generally, the blender merely sits on the power base and is driven through a conventional coupling as is well known. For flexibility, the blender jar is provided with means to secure it to the base in the form of a flange 32 to which a pair of at least opposite and directed lugs 34 are integrally molded to extend into the recess 36 in base portion 16 as seen in FIGS. 2 and 3. The arrangement is such that the blender jar 28 is placed on the base 16 with the lugs 34 depending into the base recess 36 and the jar then rotated into locking position on the base portion concentric with the bowl locking means 24 and disposed within a smaller diameter. Thus, the motor housing 12 is adjacent the bowl supporting portion and the concentric base jar securing means 34 is disposed within the processor bowl locking means 24 on a smaller diameter.

When the multi container machine is operated as a food processor, it is necessary to provide the interlock so the processor cannot be operated except when the bowl lid 20 is in position and the circuit must be deenergized if the bowl lid is removed. Operation as a processor is through appropriate "on" button 38 or a "pulse" button 40 in the manner of any conventional food processor. Operation as a blender may be through any suitable number of multi-speed buttons 42 with or without a blender pulse button and a main or "off" button 44 inactivates the entire unit—both processor and blender—or is equivalent to pulling the cord from the wall. Any suitable button arrangement may be employed and forms no part of the instant invention.

When the device is operated as a blender, it is necessary that the processor interlock structure and its circuit be by-passed and that the blender circuit be brought into operating condition and this must be done automatically by merely placing the blender jar in position. Similarly, when the jar is removed and the device converted to a processor by placing bowl 18 on the base portion, the correct processor circuitry must automatically be triggered for operation.

Figure 5:
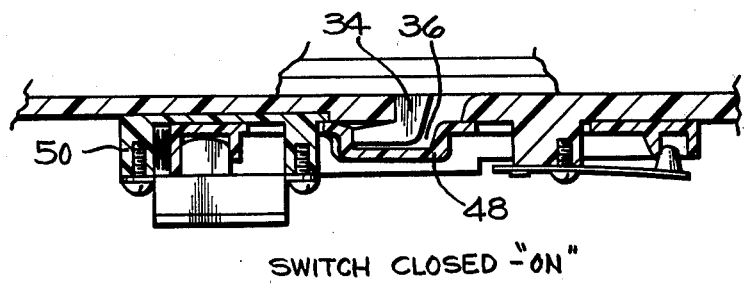
FIG. 5 is a partial section on line 5—5 of FIG. 4.
Figure 6:
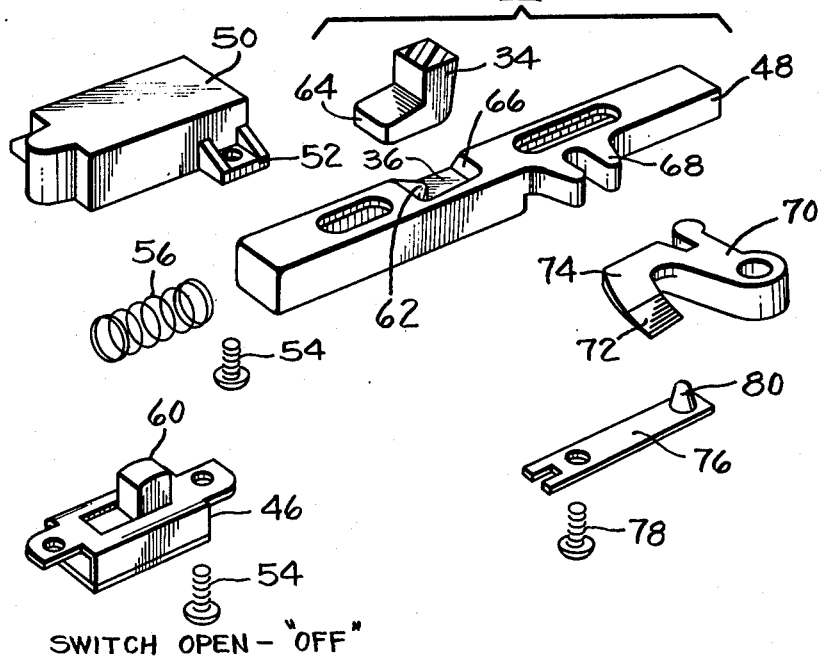
FIG. 6 is an exploded perspective of the slider mechanism and switch structure.

To this end, a second interlock mechanism is provided to cooperate with the first interlock mechanism and permit operation as a blender. It is necessary to provide a second internal jar switch 46 to be activated by the lugs 34 on flange 32 of the blender jar 28 as will be explained. The jar switch 46 is located internally of the housing as shown in FIGS. 2 and 3 and is actuated by a biased slider mechanism 48 which slider mechanism includes the recess 36. As seen in FIG. 6, the slider mechanism is in the form of a bar 48 that is longitudinally slidable and is held against the underside of the housing by a suitable bracket 50 that may be integrally molded or separately attached to the housing with the left end of slider 48 riding in a suitable internal niche in bracket 50 and being held there by the jar switch 46 forming a sandwich construction of bracket 50, slider 48, and jar switch 46 as seen in FIG. 3. The bracket is attached to the housing by screws not shown through ears 52 and the lid switch 46 attached to the bracket by screws 54. Disposed between the end of slider 48 and its niche in bracket 50 is biasing spring 56 to bias the slider to the right as shown in FIGS. 2 and 3. For clarity, jar switch 46 is omitted from FIG. 2 to show the niche 58 in bracket 50 guiding the left end of slider 48. Jar switch 46 is a simple slide switch with internal biasing not shown but supplementing spring 56 and with button 60 movable to the right to open or "off" position as shown in FIGS. 3 and 6 or the to left to closed or "on" position as shown in FIG. 5. To prevent sharp objects such as pencils or the like being pushed into recess 36 and actuating jar switch 46, the slider mechanism is provided with a conical surface 62 in the form of a conical peak, like a roof line, so that it is almost impossible to actuate the slider from outside except through the flat blunt end 64 of directed lug 34 on jar 28. Thus, the contact between surfaces 64 and 62 is, depending on the thickness of surface 64, essentially a point contact to prevent the inadvertent operation of the jar switch from without—a safety feature. Similarly, the recess 36 in slider 48 has an offset abutment side 66 so that the nested lug 34 provides positive movement of the slider in both directions—the switch operating direction being through the point contact of coned surface 62 to avoid outside actuation of the switch to closed or "on" position by some external implement. Thus, it will be seen that rotation of the jar 28 through its molded lugs 34 operatively connects with the internal jar switch 46 through slider mechanism 48.

Figure 7:
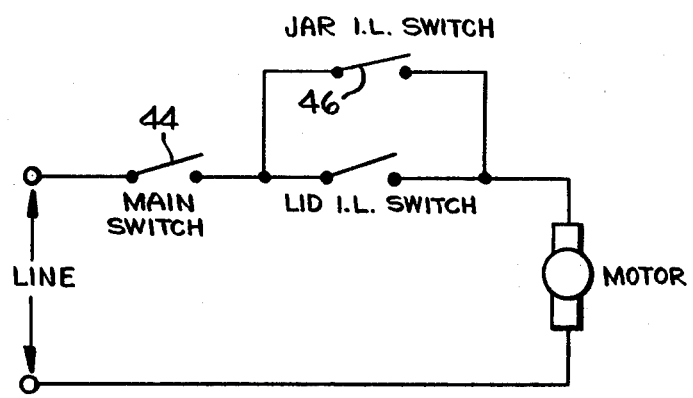
FIG. 7 is a schematic diagram of the energizing circuit.

Referring to FIG. 7, a simplified circuit diagram is shown involving the motor and the two interlocking lid and jar switches. With main switch 44 closed, it will be seen that the processor is operable when the lid interlock I.L. switch of the processor is closed exactly as disclosed in said co-pending application Ser. No. 790,271 of common assignment incorporated herein by reference. At that time the jar interlock switch 46 is open and the blender branch is dead. When processor bowl 18 and lid 20 are absent, the lid interlocking switch is automatically open. Placing the blender jar 28 in position closes jar interlock switch 46 to "on" to activate the blender branch through the motor thus making the blender operable. The various internal switch wiring for the pulsing and the various speeds is strictly a matter of electrical wiring and forms no part of the disclosure herein which is directed to the double interlock enabling use as a multi container interlocked food machine.

Figure 4:
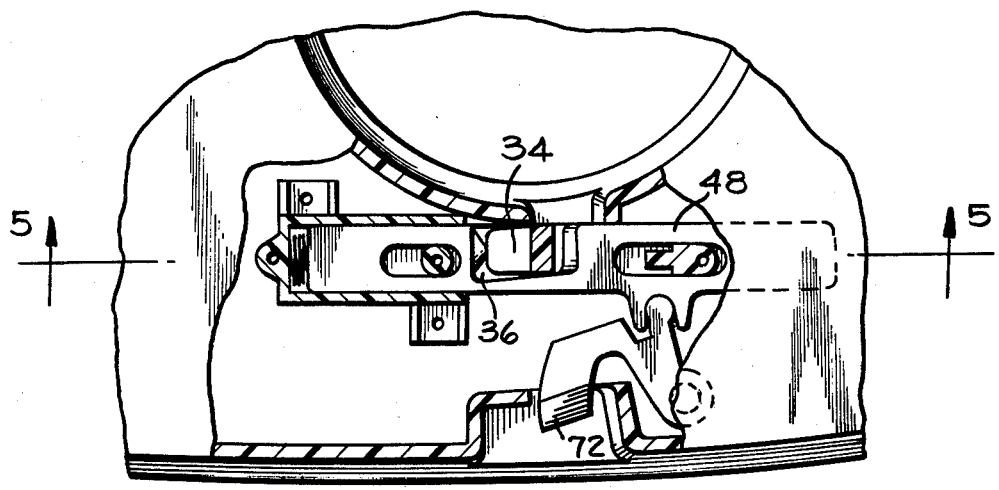
FIG. 4 is a partial view, at arrow 2 in FIG. 1, showing the jar switch in "closed" position.

Inasmuch as jar interlock switch 46 must be "open" for the device to operate as a processor, positive linkage is provided in the second interlocking structure. To this end, bias slider 48 is equipped with a U-shaped extension 68 extending out the side as shown in FIG. 6 and meshing with this is a pivoted link 70 disposed between the slider and the processor bowl locking means 24 (FIG. 2) with the link being connected to the slider by a ball fitting as shown so that an extension on one end of link 70 is pivoted directly into locking means 24 as shown in FIG. 4 when the slider is in its left position or jar switch 46 is in "on" position. It is automatically pivoted out of locking means 24 by processor bowl 18 when slider 48 is in its right position or jar switch 46 is "off" as shown in FIG. 2. Thus, pivoted link 70 provides a positive engagement with the lugs on the processor bowl 18 when the bowl is positioned in its locking means 24. This ensures that, in changing from blender operation to processor operation, if for some reason the jar interlock switch 46 should not be opened or turned "off" in order to by-pass the blender branch of FIG. 7 and permit operation of the processor branch, the lugs on bowl 18 will physically move the extensions on link 70 to force the switch open or "off" from the position of FIG. 4 to that of FIG. 2. Normally, the switch is biased strongly enough by its internal spring and by bias spring 56 to assist its return but the pivoted link 70 provides a positive engagement if necessary. The positive engagement is enhanced by the provision of a cammed surface 72 on extension 74 that extends into the locking means 24. Thus, the corresponding lug-like locking means 24 normally provided on the processor bowl 18 actually cams link 70 to automatically pivot it to open jar switch 46 to "off" when the processor bowl is placed in position.

In order to positively lock or latch the slider in each of its end positions of switch open and "off" as shown in FIG. 3 or closed and "on" position shown in FIG. 5, any suitable means may be used such as a simple spring element 76 attached to the bottom of casing 16 by screw 78. A coned projection 80 on the end of element 76 is designed to snap on one side or the other of wall 82 formed in slider 48 with the two mating surfaces being slightly angled or coned so that the projection 80 easily rides over the end of wall 82 to latch the slider in each of the switch positions as shown in FIGS. 3 and 5.

Thus, the second interlock mechanism comprising the parts as described and shown, added to the general combination and interlock mechanism of said co-pending application Ser. No. 790,271 provides a multi container interlocked food machine which be used either as a food processor or a blender depending on which container is placed in position. With the interlocking mechanism automatically coming into play and coordinating with each other such that the user need do no more than place the desired container in position. This permits much greater flexibility in a food processor and enables one basic power base to be operable as a dual machine with the interlocking mechanism of each machine cooperating with the other so that the processor may be operated safely as in said Ser. No. 790,271 application and this processor interlock being automatically disengaged for operation as a blender by the cooperating second interlock mechanism disclosed herein. It also permits the use of the food processor bowl to disconnect the blender circuitry in the event that it is not automatically done so by the mere placment of the food processor bowl in position for positively providing for by-passing the blender circuit by engagement with pivoted link 70 as described.

While we have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

We claim:

1. In a multi container interlocked food machine having a power base with a bowl-supporting portion and driven shaft extending vertically therefrom, and an upstanding motor-containing housing, a processor bowl having means locking it on said portion and containing a cutter on said shaft, a lid on said bowl operatively connected to an interlock of an internal lid switch-controlled motor energizing circuit to deenergize said circuit on lid removal, an improved cooperating second interlock comprising,
   a separate smaller diameter blender jar and cutter disposable on said shaft,
   base securing means on said jar locking it on said base portion concentric with said bowl means locking portion,
   an internal jar switch connected to said switch,
   said base securing means operatively connecting with said jar switch,
   whereby on mounting said jar on the base, the jar switch is closed to "on" to by-pass the lid switch inactivating the processor bowl interlock for operation of the machine with said jar as a blender.

2. Apparatus as described in claim 1 wherein said motor containing housing is adjacent said bowl supporting portion and
   said concentric base jar securing means is disposed within said processor bowl locking means.

3. Apparatus as described in claim 2 wherein said jar switch is spring-biased to "off" position and
   said base securing means on said jar includes directed lug means thereon operable to close said jar switch to "on" during rotation of said jar to engage said base securing means.

4. Apparatus as described in claim 3 wherein a biased slider mechanism is interposed between said jar lug means and jar switch for operating said jar switch and,
   means to latch said slider in each switch position.

5. Apparatus as described in claim 4 wherein a pivoted link is disposed between said slider and processor bowl locking means on said portion,
   said link being connected to said slider
   whereby said processor bowl locking means operates said jar switch to "on" position.

6. Apparatus as described in claim 4 wherein said slider mechanism is provided with a conical surface and
   said lug means engages on said surface in substantially a point contact to move said slider and jar switch to "on" position.

7. Apparatus as described in claim 5 wherein said link has an extension into said processor bowl locking means,
   a cam on said extension for actuation by said processor bowl locking means
   whereby said link is pivotally cammed to move said jar switch to "off" on placement of said processor bowl.

8. Apparatus as described in claim 6 wherein said slider has a recess therein to nest said lug for positive movement of the slider in both directions,
one side of said recess having said conical surface and the opposite side having an abutment for contact with said slider on jar rotation to "off" position of the jar switch on rotation for removal of said jar.

* * * * *